(12) United States Patent
Jain et al.

(10) Patent No.: US 10,493,629 B2
(45) Date of Patent: Dec. 3, 2019

(54) MULTISENSORY DATA FUSION SYSTEM AND METHOD FOR AUTONOMOUS ROBOTIC OPERATION

(71) Applicant: General Electric Company, Schenectady, NY (US)

(72) Inventors: Arpit Jain, Niskayuna, NY (US); Charles Burton Theurer, Alplaus, NY (US); Balajee Kannan, Niskayuna, NY (US); Shiraj Sen, Niskayuna, NY (US); Pramod Sharma, Seattle, WA (US); Shuai Li, Troy, NY (US); Shubao Liu, College Park, MD (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 406 days.

(21) Appl. No.: 15/399,313

(22) Filed: Jan. 5, 2017

(65) Prior Publication Data

US 2017/0341237 A1 Nov. 30, 2017

Related U.S. Application Data

(60) Provisional application No. 62/342,431, filed on May 27, 2016.

(51) Int. Cl.
*H04N 13/239* (2018.01)
*B25J 9/16* (2006.01)
(Continued)

(52) U.S. Cl.
CPC .......... *B25J 9/1697* (2013.01); *B25J 9/1612* (2013.01); *G06K 9/00664* (2013.01);
(Continued)

(58) Field of Classification Search
CPC ....... B25J 9/1697; B25J 9/1612; G06T 7/579; G06T 7/73; G06T 2207/10016;
(Continued)

(56) References Cited

U.S. PATENT DOCUMENTS 7,689,321 B2  3/2010  Karlsson
7,805,227 B2  9/2010  Welles et al.
(Continued)

OTHER PUBLICATIONS

Perronnin et al., "Fisher Kernels on Visual Vocabularies for Image Categorization", 2007 IEEE Conference on Computer Vision and Pattern Recognition, pp. 1-8, Jun. 17-22, 2007.
(Continued)

*Primary Examiner* — Siamak Harandi
(74) *Attorney, Agent, or Firm* — Christopher R. Carroll; The Small Patent Law Group LLC

(57) ABSTRACT

A robotic system includes one or more optical sensors configured to separately obtain two dimensional (2D) image data and three dimensional (3D) image data of a brake lever of a vehicle, a manipulator arm configured to grasp the brake lever of the vehicle, and a controller configured to compare the 2D image data with the 3D image data to identify one or more of a location or a pose of the brake lever of the vehicle. The controller is configured to control the manipulator arm to move toward, grasp, and actuate the brake lever of the vehicle based on the one or more of the location or the pose of the brake lever.

19 Claims, 3 Drawing Sheets

(51) Int. Cl.
    *G06K 9/00*     (2006.01)
    *G06K 9/62*     (2006.01)
    *H04N 13/20*    (2018.01)
    *H04N 13/271*   (2018.01)
    *H04N 13/10*    (2018.01)
    *G06T 7/73*     (2017.01)
    *G06T 7/579*    (2017.01)

(52) U.S. Cl.
    CPC ............ *G06K 9/6293* (2013.01); *G06T 7/579* (2017.01); *G06T 7/73* (2017.01); *H04N 13/10* (2018.05); *H04N 13/20* (2018.05); *H04N 13/239* (2018.05); *H04N 13/271* (2018.05); *G06T 2207/10016* (2013.01); *G06T 2207/10024* (2013.01); *G06T 2207/10028* (2013.01); *Y10S 901/01* (2013.01); *Y10S 901/47* (2013.01)

(58) Field of Classification Search
    CPC .......... G06T 2207/10024; G06T 2207/10028; H04N 13/239; H04N 13/10; H04N 13/271; H04N 13/20; G06K 9/6293; G06K 9/00664; Y10S 901/01; Y10S 901/47
    See application file for complete search history.

(56) References Cited

U.S. PATENT DOCUMENTS

| | | |
|---|---|---|
| 8,583,313 B2 | 11/2013 | Mian |
| 9,183,459 B1 | 11/2015 | Zhang et al. |
| 9,250,081 B2 | 2/2016 | Gutmann et al. |
| 2006/0195327 A1 | 8/2006 | Kumar et al. |
| 2015/0269438 A1* | 9/2015 | Samarasekera .... G06K 9/00637 382/154 |

OTHER PUBLICATIONS

Felzenszwalb et al., "Object Detection with Discriminatively Trained Part-Based Models", IEEE Transactions on Pattern Analysis and Machine Intelligence, vol. 32, Issue: 9, pp. 1627-1645, Sep. 2010.

Wohlkinger et al., "Ensemble of shape functions for 3D object classification", Robotics and Biomimetics (ROBIO), 2011 IEEE International Conference on, pp. 2987-2992, Dec. 7-11, 2011.

Krizhevsky et al., "ImageNet Classification with Deep Convolutional Neural Networks", Advances in Neural Information Processing Systems, pp. 1097-1105, 2012.

Stein et al., "Convexity based object partitioning for robot applications", 2014 IEEE International Conference on Robotics and Automation (ICRA), pp. 3213-3220, May 31-Jun. 7, 2014.

Pfitzner et al., "3D Multi-Sensor Data Fusion for Object Localization in Industrial Applications", ISR/Robotik 2014; 41st International Symposium on Robotics; Proceedings of, pp. 1-6, Jun. 2-3, 2014.

Labbe et al., "Online global loop closure detection for large-scale multi-session graph-based SLAM", 2014 IEEE/RSJ International Conference on Intelligent Robots and Systems, pp. 2661-2666, Sep. 14-18, 2014.

* cited by examiner

MULTISENSORY DATA FUSION SYSTEM AND METHOD FOR AUTONOMOUS ROBOTIC OPERATION

CROSS-REFERENCE TO RELATED APPLICATIONS

This application claims priority to U.S. Provisional Application No. 62/342,431, filed on 27 May 2016, the entire disclosure of which is incorporated herein by reference.

FIELD

The subject matter described herein relates to systems and methods for autonomously maintaining vehicles.

BACKGROUND

The challenges in the modern vehicle yards are vast and diverse. Classification yards, or hump yards, play an important role as consolidation nodes in vehicle freight networks. At classification yards, inbound vehicle systems (e.g., trains) are disassembled and the cargo-carrying vehicles (e.g., railcars) are sorted by next common destination (or block). The efficiency of the yards in part drives the efficiency of the entire transportation network.

The hump yard is generally divided into three main areas: the receiving yard, where inbound vehicle systems arrive and are prepared for sorting; the class yard, where cargo-carrying vehicles in the vehicle systems are sorted into blocks; and the departure yard, where blocks of vehicles are assembled into outbound vehicle systems, inspected, and then depart.

Current solutions for field service operations are labor-intensive, dangerous, and limited by the operational capabilities of humans being able to make critical decisions in the presence of incomplete or incorrect information. Furthermore, efficient system level-operations require integrated system wide solutions, more than just point solutions to key challenges. The nature of these missions dictates that the tasks and environments cannot always be fully anticipated or specified at the design time, yet an autonomous solution may need the essential capabilities and tools to carry out the mission even if it encounters situations that were not expected.

Solutions for typical vehicle yard problems, such as brake bleeding, brake line lacing, coupling cars, etc., can require combining mobility, perception, and manipulation toward a tightly integrated autonomous solution. When placing robots in an outdoor environment, technical challenges largely increase, but field robotic application benefits both technically and economically. One key challenge in yard operation is that of bleeding brakes on inbound cars in the receiving yard. Railcars have pneumatic breaking systems that work on the concept of a pressure differential. The size of the brake lever is significantly small compared to the size of the environment and the cargo-carrying vehicles. Additionally, there are many variations on the shape, location, appearance, and the material of the brake levers. Coupled with that is the inherent uncertainty in the environment; every day, vehicles are placed at different locations, and the spaces between cars are very narrow and unstructured. As a result, an autonomous solution for maintenance (e.g., brake maintenance) of the vehicles presents a variety of difficult challenges.

BRIEF DESCRIPTION

In one embodiment, a robotic system includes one or more optical sensors configured to separately obtain two dimensional (2D) image data and three dimensional (3D) image data of a vehicle and a controller configured to compare the 2D image data with the 3D image data to identify one or more of a location or a pose of a component of the vehicle.

In one embodiment, a robotic system includes one or more optical sensors configured to separately obtain two dimensional (2D) image data and three dimensional (3D) image data of a brake lever of a vehicle, a manipulator arm configured to grasp the brake lever of the vehicle, and a controller configured to compare the 2D image data with the 3D image data to identify one or more of a location or a pose of the brake lever of the vehicle. The controller is configured to control the manipulator arm to move toward, grasp, and actuate the brake lever of the vehicle based on the one or more of the location or the pose of the brake lever.

In one embodiment, a method includes obtaining two dimensional (2D) image data of a vehicle, separately obtaining three dimensional (3D) image data of the vehicle, determining one or more of a location or a pose of a component of the vehicle by comparing the 2D image data with the 3D image data, and automatically controlling a robotic system to grasp and actuate the component of the vehicle to change a state of the vehicle based on the one or more of the location or the pose that is determined.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide robotic systems and methods that provide a large form factor mobile robot with a manipulator arm to effectively detect, identify, and subsequently manipulate brake levers of vehicles. The robotic system autonomously navigates within a route corridor along the length of a vehicle system, moving from vehicle to vehicle within the vehicle system.

An initial "course" estimate of a location of a brake rod or lever on a selected or designated vehicle in the vehicle system is provided to or obtained by the robotic system. This coarse estimate can be derived or extracted from a database or other memory structure that represents the vehicles present in the corridor (e.g., the vehicles on the same segment of a route within the yard). The robotic system moves through or along the vehicles and locates the brake lever rods on the side of one or more, or each, vehicle. The robotic system positions itself next to a brake rod to then actuate a brake release mechanism (e.g., to initiate brake bleeding) by manipulating the brake lever rod.

During autonomous navigation, the robotic system maintains a distance of separation (e.g., about four inches or ten centimeters) from the plane of the vehicle while moving forward toward the vehicle. In order to ensure real-time brake rod detection and subsequent estimation of the brake rod location, a two-stage detection strategy is utilized. Once the robotic system has moved to a location near to the brake rod, an extremely fast two-dimensional (2-D) vision-based search is performed by the robotic system to determine and/or confirm a coarse location of the brake rod. The second stage of the detection strategy involves building a dense model for template-based shape matching (e.g., of the brake rod) to identify the exact location and pose of the break rod. The robotic system can move to approach the brake rod as necessary to have the brake rod within reach of the robotic arm of the robotic system. Once the rod is within reach of the robotic arm, the robotic system uses the arm to manipulate and actuate the rod.

Figure 1:
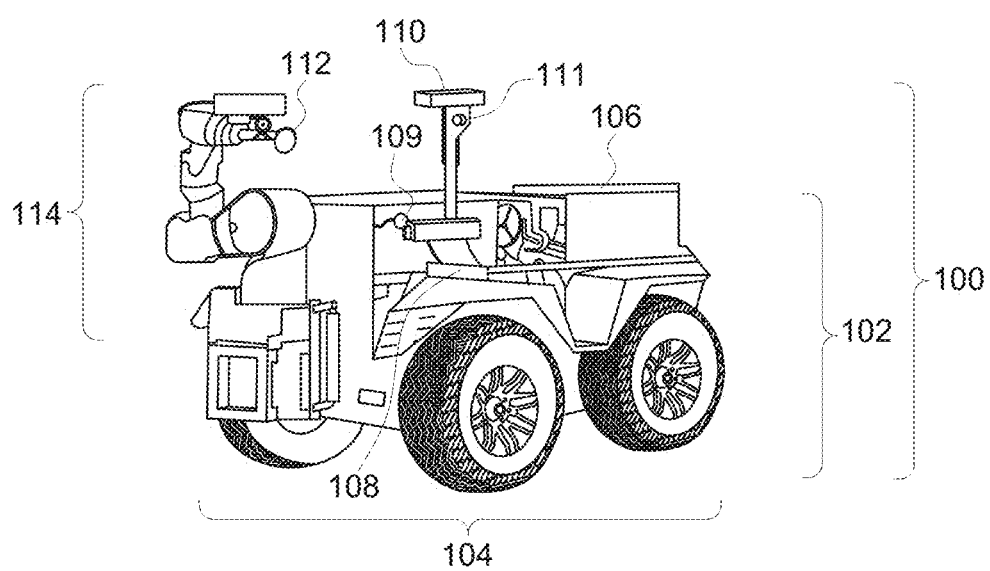
FIG. 1 illustrates one embodiment of a robotic system.

FIG. 1 illustrates one embodiment of a robotic system 100. The robotic system 100 may be used to autonomously move toward, grasp, and actuate (e.g., move) a brake lever or rod on a vehicle in order to change a state of a brake system of the vehicle. For example, the robotic system 100 may autonomously move toward, grasp, and move a brake rod of an air brake system on a rail car in order to bleed air out of the brake system. The robotic system 100 includes a robotic vehicle 102 having a propulsion system 104 that operates to move the robotic system 100. The propulsion system 104 may include one or more motors, power sources (e.g., batteries, alternators, generators, etc.), or the like, for moving the robotic system 100. A controller 106 of the robotic system 100 includes hardware circuitry that includes and/or is connected with one or more processors (e.g., microprocessors, field programmable gate arrays, and/or integrated circuits) that direct operations of the robotic system 100.

The robotic system 100 also includes several sensors 108, 109, 110, 111, 112 that measure or detect various conditions used by the robotic system 100 to move toward, grasp, and actuate brake levers. The sensors 108-111 are optical sensors, such as cameras, infrared projectors and/or detectors. While four optical sensors are shown, alternatively, the robotic system 100 may have a single optical sensor, less than four optical sensors, or more than four optical sensors. In one embodiment, the sensors 109, 111 are RGB cameras and the sensors 110, 112 are time of flight depth sensors or cameras with RGB cameras, but alternatively may be another type of sensor or camera.

The sensor 112 is a touch sensor that detects when a manipulator arm 114 of the robotic system 100 contacts or otherwise engages a surface or object. The touch sensor 112 may be one or more of a variety of touch-sensitive devices, such as a switch (e.g., that is closed upon touch or contact), a capacitive element (e.g., that is charged or discharged upon touch or contact), or the like.

The manipulator arm 114 is an elongated body of the robotic system 100 that can move in a variety of directions, grasp, and pull and/or push a brake rod. The controller 106 may be operably connected with the propulsion system 104 and the manipulator arm 114 to control movement of the robotic system 100 and/or the arm 114, such as by one or more wired and/or wireless connections. The controller 106 may be operably connected with the sensors 108-112 to receive data obtained, detected, or measured by the sensors 108-112.

Figure 2:
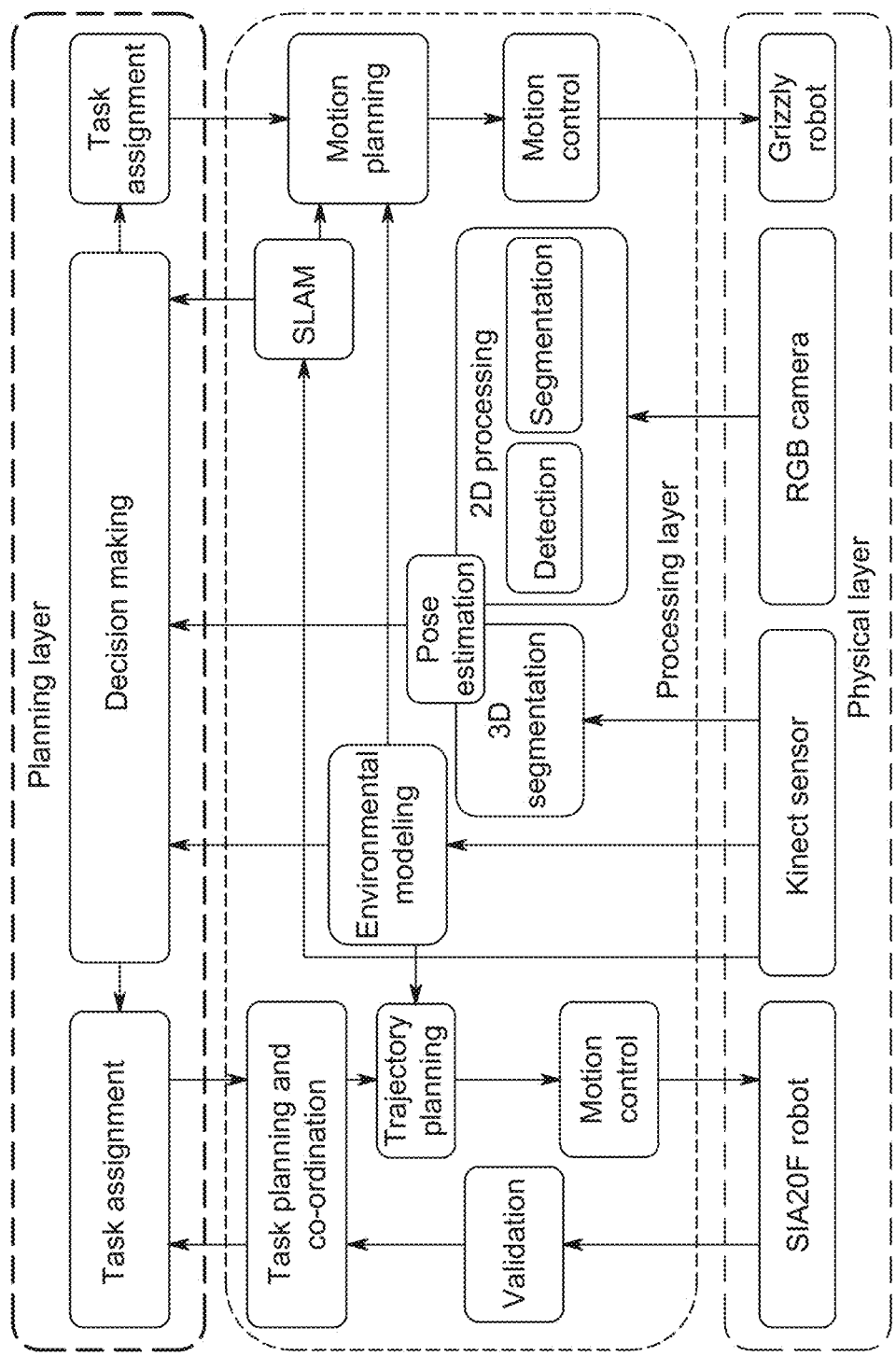
FIG. 2 illustrates a control architecture used by the robotic system shown in FIG. 1 to move toward, grasp, and actuate a brake lever or rod according to one embodiment.

FIG. 2 illustrates a control architecture 200 used by the robotic system 100 to move toward, grasp, and actuate a brake lever or rod according to one embodiment. The architecture 200 may represent the operations performed by various components of the robotic system 100. The architecture 200 is composed of three layers: a physical layer, a processing layer, and a planning layer. The physical layer deals with control of the robotic system 100 ("Grizzly Robot" in FIG. 2), the manipulator arm 114 ("SIA20F Robot" in FIG. 2) and sensors 108-111 ("Kinect Sensor" and "RGB Camera" in FIG. 2).

The processing layer includes several operations or tasks dictated or directed by the controller 106 to control operation of the robotic system 100. The processing layer includes a deliberation operation, a perception operation, a navigation operation, and a manipulation operation performed or directed by the controller 106. In performing the deliberation operation, the controller 106 plans and coordinates the other operations performed by the robotic system 100. The controller 106 receives information from the sensors 108-112 and makes decisions to move the robotic system 100 based on the information received from the sensors 108-112. The perception operation involves the controller 106 processing the information received from the sensors 108-111 to determine poses of brake levers to be actuated by the manipulator arm 114. The navigation operation involves the controller 106 commanding the propulsion system 104 of the robotic system 100 on how to operator in order to move the robotic system 100 to a desired or determined position. In order to move safely and precisely, a variant of an RTAB-Map algorithm may be used by the controller 106 to perform environmental modeling and provide information for planning movement of the robotic system 100 to avoid collisions with other objects or persons. The manipulation operation is performed by the controller 106 for controlling the manipulator arm 114 to touch the brake lever.

In the planning layer, the information received from the sensors 108-112 and the states of the components of the robotic system 100 are collected from the physical layer and the planning layer. According to requirements of a task, the controller 106 determines how to control the various components of the robotic system 100 based on current task-relevant situation.

The robotic system 100 is used to actuate brake levers on vehicles. The system 100 operates by autonomously navigating within a route corridor along the length of a vehicle system having multiple vehicles connected with or otherwise adjacent to each other. The system 100 moves from vehicle-to-vehicle based on an initial coarse estimate of the brake rod location from a database. The system 100 locates a brake rod, positions itself next to or near the brake rod before actuating the brake rod. During the autonomous navigation, the robotic system 100 maintains a distance of separation (e.g., no more than four inches or ten centimeters) from the plane of the vehicles while moving forward.

In order to ensure real-time brake rod detection and subsequent estimation of the brake rod location, a two-stage detection strategy is used by the controller 106. Once the robotic system 100 has moved to a location near the brake rod location (e.g., within the reach of the manipulator arm 114), an extremely fast 2D vision-based search algorithm is performed by the controller 106 based on images provided by the optical sensors 109, 111 to confirm a coarse location of the brake rod. If one or more shapes identified in the 2D images obtained by the optical sensors 109, 111 match designated shapes of a brake rod, then the controller 106 may proceed to the second stage of the algorithm. Otherwise, the controller 106 determines that the brake rod is not present in the 2D images and optionally may control the robotic system 100 to move to another location. The second stage of the algorithm involves the controller 106 building a dense model for template-based shape matching (e.g., of the brake rod) based on 3D information provided by the optical sensors 108, 110 to identify the exact location and pose of the brake rod. The controller 106 can then control the manipulator arm 114 (e.g., which may include motors coupled with different, interconnected segments of the arm 114) to actuate and manipulate the rod with the arm 114.

Detecting and finding the correct 6D pose of the brake lever is performed by the controller 106 based on information provided by the sensors 108-111 for actuating the brake lever or rod. In one embodiment, the controller 106 detects the brake rod by fusing or otherwise combining 2D images provided by the sensors 109, 111 and 3D point clouds provided by the sensors 108, 110. Alternatively, both the 2D and 3D data may be provided by the same sensor. Objects in the 2D images and 3D point clouds are then combined temporally and examined reasoned upon in an online fashion by using real time simultaneous localization and mapping (SLAM). The controller 106 may determine a confidence parameter that assigns values to the candidate detections based on spatial and temporal consistency of the candidates in the 2D and 3D image data. The confidence parameter also can take into account uncertainty in detection location due to occlusion or SLAM misalignment. For example, a first candidate detection (or potential object in image data that may be an object of interest) may have a greater confidence parameter relative to a different, second candidate detection when the first candidate detection appears in the same location in different sets of the image data (e.g., spatial consistency) and/or the first candidate detection appears in the image data over a longer period of time (e.g., temporal consistency) than the second candidate detection.

Figure 3:
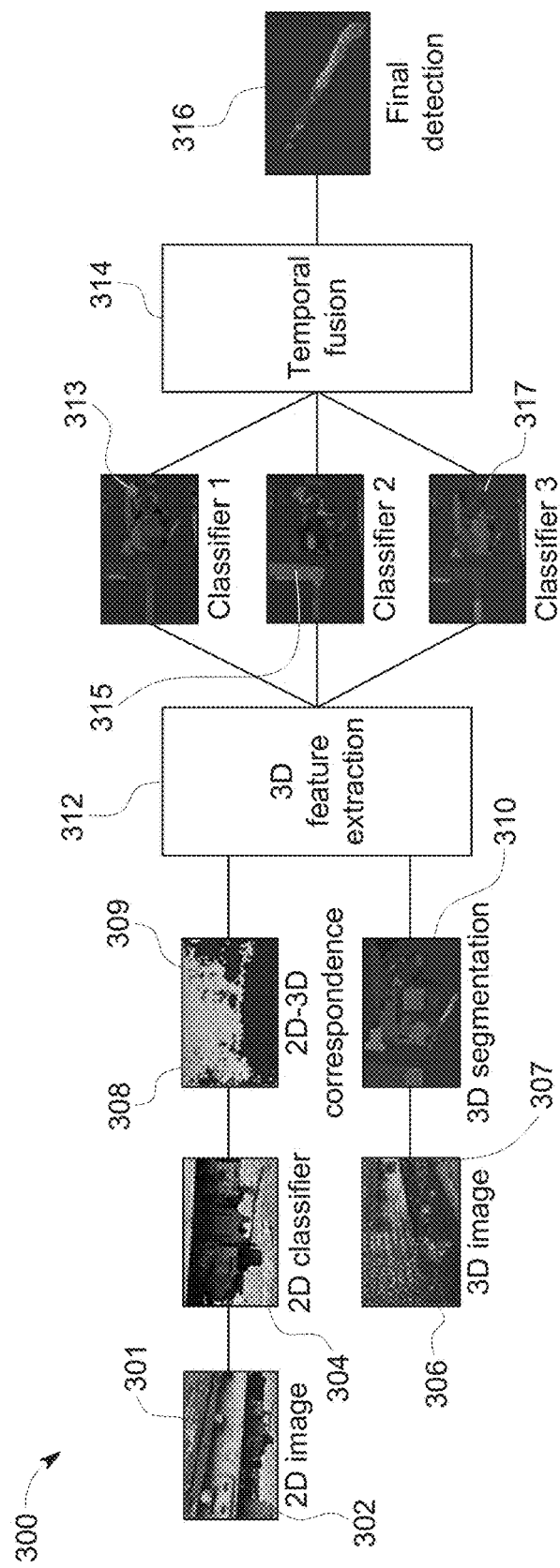
FIG. 3 illustrates a flowchart of one embodiment of a method for autonomous vehicle maintenance.

FIG. 3 illustrates a flowchart of one embodiment of a method 300 for autonomous vehicle maintenance. The method 300 may be performed by the robotic system 100 to perform vehicle maintenance, such as bleeding air brakes of a vehicle. At 302, a 2D image of a vehicle 301 is obtained. The controller 106 may direct one or more of the sensors 108-111 to obtain one or more 2D images of the vehicle 301.

At 304, one or more objects in the 2D image are classified as candidate objects or are not classified as candidate objects. The controller 106 may examine the 2D image and determine if any objects are shown in the 2D image. In one embodiment, the controller 106 can examine the 2D image and group areas of the image (e.g., groups of pixels) having the same or similar color or chrominance, the same intensity or brightness, the same texture, etc. Two or more areas of an image may have a similar color or chrominance when the coordinates of the colors of the areas in the CIE 1976 color space are within a designated, non-zero distance of each other (e.g., the u' values of the coordinates are within 1%, within 5%, or within 10% of each other). Two or more areas of an image may have a similar intensity or brightness when the intensities or average intensities of the areas are within a designated limit of each other (e.g., the intensities are within 1%, within 5%, or within 10% of each other). The grouped areas in the 2D image may be compared with designated shape templates or training images. The shape templates or training images can represent shapes of a brake rod or lever. For example, an elongated rectangle may be used as a shape template for a brake rod or a previously acquired image of a brake rod may be used as a training image. The controller 106 compares the shape, size, aspect ratio, etc., of the grouped area or areas in the 2D image with the shape template or training image to determine if the grouped area or areas match the shape template or training image. The grouped area or areas match the shape template or training image when the shape of the grouped area(s) overlaps with the shape template or the brake rode in the training image by at least a designated amount (e.g., at least 50%, at least 70%, or at least 90% overlap), when the size (e.g., area) of the grouped area(s) is within a designated limit of the size of the shape template or brake rod in the training image (e.g., the areas are within 1%, 3%, or 5% of each other), and/or when the aspect ratio of the grouped area(s) is within a designated limit of the aspect ratio of the shape template or brake rod in the training image (e.g., the aspect ratios are within 1%, 3%, or 5% of each other). Alternatively, the controller 106 may detect the object in the 2D image in another manner. If the controller detects such an object, then the object may be referred to as a candidate or candidate object, as the object may be a visual representation of a brake rod. If no objects are detected or the object is not identified as a candidate, then the object is not classified as a candidate object.

At 306, one or more 3D images 307 are obtained. 3D images of the same or overlapping area of the vehicle and/or candidate object(s) may be obtained by one or more of the sensors 108, 110. The controller 106 may, responsive to detecting the candidate object(s) in the 2D image, direct the sensors 108 and/or 110 to obtain the 3D image(s). In one embodiment, the 3D image that is obtained is a 3D point cloud of the candidate object(s). The 3D point cloud may be obtained by one or more structured-light 3D cameras or other types of cameras.

At 308, the 2D and 3D images are combined. A 2D-3D correspondence image or data set 309 may be created by the controller 106 based on the 2D and 3D image data in order to combine the images. In one embodiment, the correspondence image 309 may be created by overlapping or superimposing the 3D point cloud onto the 2D image. These images may be combined in order to assist or allow the controller 106 to examine the candidate objects in the images and determine whether these candidate objects represent a brake rod or lever.

At 310, one or more candidate objects in the combined image data are segmented into separate candidate objects. In one embodiment, the controller 106 uses a deformable part-based model is used to filter the image and reduce the number of object candidates previously identified by the controller 106. The controller 106 uses the model to learn the appearance and spatial arrangement of the object shown in the image and parts of the image using a histogram of oriented gradient features. A designated number of top candidates in the histogram that are above a threshold are selected as potential object hypotheses (e.g., parts of potential candidate objects).

In one embodiment, the controller 106 may use a locally convex connected patches (LCCP) algorithm to segment the 3D point cloud. The LCCP algorithm applies a bottom up approach that merges super voxels into object parts based on a local convexity/concavity criterion. A basic filtering step based on size and shape constraints are applied to these segments to reduce the object hypothesis space.

At 312, the potential objects identified or selected at 310 are extracted from the combined 2D and 3D image data. For example, the controller 106 may generate separate images or sets of image data 313, 315, 317 that each includes a different potential object selected or identified from the combined 2D and 3D image data. The controller 106 may examine the potential objects and classify the potential objects as a potential object of interest (e.g., a brake lever) or another object. This classification can involve calculating a percentage or probability that the potential object is the object of interest, such as by determining a degree or amount of match between shapes, colors, sizes, textures, etc.

between the potential object and the object of interest (e.g., from a previously obtained or generated image of the object of interest).

In one embodiment, the controller 106 extracts an ensemble of shape functions (ESF) from the image data representative of each of the 3D potential objects. Multiple (e.g., three) histograms are generated from each of these shape functions, including the histogram of the connecting lines generated from random points that lie on the object surfaces in the image data, the histogram of connecting lines that do not lie on the object surfaces, and the histogram for the situation when part of the connecting lines lies on the object surfaces. A 3D feature descriptor comprising multiple histograms is encoded by the controller 106 into a single high dimensional feature descriptor by using Fisher Vector encoding.

At 314, the potential objects extracted at 312 are examined to determine which, if any, represent the brake rod or lever of the vehicle. In one embodiment, the controller 106 compares the extracted objects to designated images (e.g., training images or shapes) representative of brake levers or rods. Based on which potential object more closely looks like the designated image representative of the brake rod or lever, the controller 106 can select the potential object represents the brake rod or lever. Different designated images may represent different brake rods or levers, and/or may represent different poses (e.g., orientations) of brake rods or levers.

In one embodiment, the controller 106 may apply a voting scheme or technique to examine the extracted potential objects and determine which represents the brake rod or lever. In this scheme, each vote for an extracted potential object represents an increased likelihood that the same potential object represents the position (e.g., location, orientation, and/or pose) of the brake lever or rod. Confidence values can be determined by the controller 106 for the various extracted potential objects. The confidence values are larger for those extracted potential objects that are more likely to represent the brake lever or rod, and are smaller for those extracted potential objects that are less likely to represent the brake lever or rod. In one embodiment, a confidence value can be calculated based on:

$$\text{Confidence}(l_j) = \mu_j * e^{(\mu_j * \text{Count}_j - \delta_j)}$$

where Confidence($l_j$) represents the confidence value for a $j^{th}$ extracted object, $\mu_j$ represents the mean and $\delta j$ represents the variance of classifier scores for all segments voting for location $l_j$, and $\text{Count}_j$ represents the number of segments voting for that particular location.

At 316, at least one of the extracted objects is selected as being representative of the brake rod or lever. For example, the controller 106 may identify an extracted object that more closely matches a designated image representative of a brake lever or rod as being the rod or lever. The controller 106 may then determine how to control the manipulator arm 114 to grasp and actuate the brake lever or rod. For example, after determining the location and/or pose of the brake lever or rod based on the extracted object selected as being representative of the brake rod or lever, the controller 106 can generate and communicate control signals to the motor(s) of the arm 114 to control the arm 114 to move, grasp, and push or pull the rod or lever to bleed the brake of the vehicle.

For example, after the detection of the brake lever or arm by the controller 106 is complete, the controller 106 knows where the target of interest (e.g., the brake lever) is located. Using this location (which may include the pose of the brake rod or lever), the controller 106 can plan a motion trajectory for the propulsion system and/or arm 114.

In one embodiment, a robotic system includes one or more optical sensors configured to separately obtain two dimensional (2D) image data and three dimensional (3D) image data of a vehicle and a controller configured to compare the 2D image data with the 3D image data to identify one or more of a location or a pose of a component of the vehicle.

In one example, the controller is configured to fuse the 2D image data with the 3D image data to identify the one or more of the location or the pose of the component of the vehicle. The controller can be configured to identify potential objects from the 2D image data and the 3D image data, combine the potential objects, and examine the potential objects that are combined using simultaneous localization and mapping to identify the one or more of the location or the pose of the component of the vehicle. The controller can be configured to determine confidence parameters for the potential objects based on spatial consistency and temporal consistency of the potential objects.

The one or more optical sensors may include at least a first camera configured to obtain and provide the 2D image data to the controller and at least a different, second camera configured to obtain and provide the 3D image data to the controller. In one example, the at least a first camera includes a red-green-blue (RGB) camera and the at least a second camera includes one or more of a time of flight camera or a structured light sensor. The one or more optical sensors and the controller can be disposed onboard a robotic vehicle that moves the one or more optical sensors and the controller relative to the vehicle.

The system also may include a robotic arm that is controlled by the controller to move toward, grasp, and actuate the component of the vehicle based on the one or more of the location or the pose of the component of the vehicle as identified from the 2D image data and the 3D image data. The component of the vehicle may include a brake lever.

In one example, the controller is configured to compare the 2D image data with the 3D image data by identifying one or more shapes in the 2D image data, superimposing the 3D image data onto at least the one or more shapes in the 2D image data, extract potential objects from the 3D image data based on the 3D image data superimposed on the 2D image data, and select at least one of the potential objects as representative of the component of the vehicle. The 3D image data can be a point cloud.

In one embodiment, a robotic system includes one or more optical sensors configured to separately obtain two dimensional (2D) image data and three dimensional (3D) image data of a brake lever of a vehicle, a manipulator arm configured to grasp the brake lever of the vehicle, and a controller configured to compare the 2D image data with the 3D image data to identify one or more of a location or a pose of the brake lever of the vehicle. The controller is configured to control the manipulator arm to move toward, grasp, and actuate the brake lever of the vehicle based on the one or more of the location or the pose of the brake lever.

In one example, the one or more optical sensors include at least a first camera configured to obtain and provide the 2D image data to the controller and at least a different, second camera configured to obtain and provide the 3D image data to the controller. The at least a first camera can include a red-green-blue (RGB) camera and the at least a second camera includes one or more of a time of flight camera or a structured light sensor. The one or more optical sensors and the controller may be disposed onboard a robotic vehicle that moves the one or more optical sensors and the controller relative to the vehicle.

Optionally, the controller can be configured to compare the 2D image data with the 3D image data by identifying one or more shapes in the 2D image data, superimposing the 3D image data onto at least the one or more shapes in the 2D image data, extract potential objects from the 3D image data based on the 3D image data superimposed on the 2D image data, and select at least one of the potential objects as representative of the brake lever of the vehicle. The 3D image data may be a point cloud.

In one embodiment, a method includes obtaining two dimensional (2D) image data of a vehicle, separately obtaining three dimensional (3D) image data of the vehicle, determining one or more of a location or a pose of a component of the vehicle by comparing the 2D image data with the 3D image data, and automatically controlling a robotic system to grasp and actuate the component of the vehicle to change a state of the vehicle based on the one or more of the location or the pose that is determined.

Obtaining the 2D image data can be performed by at least a first camera and obtaining the 3D image data can be performed by at least a different, second camera. The 2D image data may be obtained from a red-green-blue (RGB) camera and the 3D image data may be obtained from one or more of a time of flight camera or a structured light sensor.

Optionally, the method also may include comprising moving the robotic system relative to the vehicle based on the one or more of the location or the pose of the component that is determined. Automatically controlling the robotic system may include automatically controlling a robotic arm to move toward, grasp, and actuate the component of the vehicle based on the one or more of the location or the pose of the component of the vehicle that is determined from the 2D image data and the 3D image data.

Determining the one or more of the location or the pose of the component can include identifying one or more shapes in the 2D image data, superimposing the 3D image data onto at least the one or more shapes in the 2D image data, extracting potential objects from the 3D image data based on the 3D image data superimposed on the 2D image data, and selecting at least one of the potential objects as representative of the component of the vehicle. The 3D image data may be a point cloud.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A robotic system comprising:
one or more optical sensors configured to separately obtain two dimensional (2D) image data and three dimensional (3D) image data of a vehicle; and
a controller configured to compare the 2D image data with the 3D image data to identify one or more of a location or a pose of a component of the vehicle;
wherein the controller is configured to identify potential objects from the 2D image data and the 3D image data, combine the potential objects, and examine the potential objects that are combined using simultaneous localization and mapping to identify the one or more of the location or the pose of the component of the vehicle.

2. The system of claim 1, wherein the controller is configured to fuse the 2D image data with the 3D image data to identify the one or more of the location or the pose of the component of the vehicle.

3. The system of claim 1, wherein the controller is configured to determine confidence parameters for the potential objects based on spatial consistency and temporal consistency of the potential objects.

4. The system of claim 1, wherein the one or more optical sensors include at least a first camera configured to obtain and provide the 2D image data to the controller and at least a different, second camera configured to obtain and provide the 3D image data to the controller.

5. The system of claim 4, wherein the at least a first camera includes a red-green-blue (RGB) camera and the at least a second camera includes one or more of a time of flight camera or a structured light sensor.

6. The system of claim 1, wherein the one or more optical sensors and the controller are disposed onboard a robotic vehicle that moves the one or more optical sensors and the controller relative to the vehicle.

7. The system of claim 1, further comprising a robotic arm, wherein the controller is configured to control the robotic arm to move toward, grasp, and actuate the component of the vehicle based on the one or more of the location or the pose of the component of the vehicle as identified from the 2D image data and the 3D image data.

8. The system of claim 1, wherein the component of the vehicle includes a brake lever.

9. The system of claim 1, wherein the controller is configured to compare the 2D image data with the 3D image data by identifying one or more shapes in the 2D image data, superimposing the 3D image data onto at least the one or more shapes in the 2D image data, extract potential objects from the 3D image data based on the 3D image data superimposed on the 2D image data, and select at least one of the potential objects as representative of the component of the vehicle.

10. The system of claim 1, wherein the 3D image data is a point cloud.

11. A robotic system comprising:
one or more optical sensors configured to separately obtain two dimensional (2D) image data and three dimensional (3D) image data of a brake lever of a vehicle;
a manipulator arm configured to grasp the brake lever of the vehicle; and
a controller configured to compare the 2D image data with the 3D image data to identify one or more of a location or a pose of the brake lever of the vehicle, wherein the controller is configured to control the manipulator arm to move toward, grasp, and actuate the brake lever of the vehicle based on the one or more of the location or the pose of the brake lever.

12. The system of claim 11, wherein the one or more optical sensors include at least a first camera configured to obtain and provide the 2D image data to the controller and at least a different, second camera configured to obtain and provide the 3D image data to the controller.

13. The system of claim 12, wherein the at least a first camera includes a red-green-blue (RGB) camera and the at least a second camera includes one or more of a time of flight camera or a structured light sensor.

14. The system of claim 11, wherein the one or more optical sensors and the controller are disposed onboard a robotic vehicle that moves the one or more optical sensors and the controller relative to the vehicle.

15. The system of claim 11, wherein the controller is configured to compare the 2D image data with the 3D image data by identifying one or more shapes in the 2D image data, superimposing the 3D image data onto at least the one or more shapes in the 2D image data, extract potential objects from the 3D image data based on the 3D image data superimposed on the 2D image data, and select at least one of the potential objects as representative of the brake lever of the vehicle.

16. The system of claim 11, wherein the 3D image data is a point cloud.

17. A method comprising:
obtaining two dimensional (2D) image data of a vehicle;
separately obtaining three dimensional (3D) image data of the vehicle;
comparing the 2D image data with the 3D image data;
identifying potential objects from the 2D image data and the 3D image data;
combining the potential objects, and examining the potential objects that are combined using simultaneous localization and mapping to identify the one or more of the location or the pose of the component of the vehicle; and
automatically controlling a robotic system to grasp and actuate the component of the vehicle to change a state of the vehicle based on the one or more of the location or the pose that is determined.

18. The method of claim 17, wherein obtaining the 2D image data is performed by at least a first camera and obtaining the 3D image data is performed by at least a different, second camera.

19. The method of claim 17, wherein the 2D image data is obtained from a red-green-blue (RGB) camera and the 3D image data is obtained from one or more of a time of flight camera or a structured light sensor.

* * * * *